United States Patent
Stantchev

(10) Patent No.: US 11,766,629 B2
(45) Date of Patent: Sep. 26, 2023

(54) EXTRACTION APPARATUS AND METHOD THEREOF

(71) Applicant: George Stantchev, Phoenix, AZ (US)

(72) Inventor: George Stantchev, Phoenix, AZ (US)

( * ) Notice: Subject to any disclaimer, the term of this patent is extended or adjusted under 35 U.S.C. 154(b) by 0 days.

(21) Appl. No.: 17/659,707

(22) Filed: Apr. 19, 2022

(65) Prior Publication Data

US 2023/0124244 A1 Apr. 20, 2023

Related U.S. Application Data

(60) Provisional application No. 63/256,602, filed on Oct. 17, 2021.

(51) Int. Cl.
  *B01D 11/02* (2006.01)
  *B01D 5/00* (2006.01)
  *B01D 11/00* (2006.01)

(52) U.S. Cl.
  CPC ........ *B01D 11/0296* (2013.01); *B01D 5/0039* (2013.01); *B01D 5/0072* (2013.01); *B01D 2011/007* (2013.01)

(58) Field of Classification Search
  CPC ............... B01D 5/0039; B01D 5/0072; B01D 11/0296; B01D 2011/007
  See application file for complete search history.

(56) References Cited

U.S. PATENT DOCUMENTS

| | | | |
|---|---|---|---|
| 5,960,563 A * | 10/1999 | Kuboyama | A23N 12/08 34/76 |
| 10,617,974 B2 * | 4/2020 | Thomas | B01D 3/346 |
| 10,836,979 B2 * | 11/2020 | Stantchev | B01J 19/24 |
| 11,090,578 B2 * | 8/2021 | Stantchev | B01D 11/0238 |
| 11,248,189 B2 * | 2/2022 | Stantchev | C11B 9/025 |
| 11,299,471 B2 * | 4/2022 | Stantchev | B01D 1/0082 |
| 11,331,595 B2 * | 5/2022 | Stantchev | B01D 11/0207 |
| 2017/0113161 A1 * | 4/2017 | Stantchev | B01D 11/0442 |
| 2018/0010066 A1 * | 1/2018 | Stantchev | C11B 9/025 |
| 2018/0078874 A1 * | 3/2018 | Thomas | B01D 1/16 |
| 2019/0151771 A1 * | 5/2019 | Thomas | B01D 5/0003 |
| 2019/0275443 A1 * | 9/2019 | Stantchev | B01D 11/0207 |
| 2020/0131146 A1 * | 4/2020 | Stantchev | B01D 1/0023 |
| 2020/0246719 A1 * | 8/2020 | McGhee | C11B 1/102 |

FOREIGN PATENT DOCUMENTS

WO WO-2008071985 A2 * 6/2008 ......... B01D 11/0288

* cited by examiner

*Primary Examiner* — Jonathan Miller

(57) ABSTRACT

An apparatus for extracting essential oils and oleoresins from a plant material is disclosed. The apparatus comprises a circulation pump, a discharging pump, an extraction module, a reservoir, a first evaporator, and a first condenser. The discharge pump is fluidly connected to the circulation pump. The extraction module includes at least one extraction vessel. The reservoir is configured to store a solvent containing a C1 to C4 fluorinated hydrocarbon. In a short loop circulation mode the discharge pump pumps a solution comprising the solvent and one or more active components of the plant material dissolved therein from the bottom of the at least one extraction vessel, passing through the circulation pump, and then back to the top of the at least one extraction vessel.

25 Claims, 9 Drawing Sheets

EXTRACTION APPARATUS AND METHOD THEREOF

CROSS REFERENCE TO RELATED APPLICATIONS

This application claims priority under 35 U.S.C. § 119(e) to U.S. Provisional Patent Application No. 63/256,602 filed Oct. 17, 2021, the content of which is incorporated herein by reference in its entirety.

TECHNICAL FIELD

This disclosure relates to an apparatus or system for fluid extraction of essential oils and oleoresins from a plant material. This disclosure also relates to a method for extracting essential oils and oleoresins from a plant material using said apparatus or system.

BACKGROUND

Various active plant substances, for example, alkaloids, glucosides, volatile oils, resins, lipids, tannins, etc., have been used for pharmaceutical applications. Essential oils and oleoresins are used in a wide variety of consumer goods such as detergents, soaps, toilet products, cosmetics, pharmaceuticals, perfumers, confectionery food products, soft drinks, distilled alcoholic beverages, and insecticides. The production and consumption of essential oils and perfumes worldwide are rapidly growing.

Production technology is essential to the improvement of yield and quality of essential oils. Traditional technologies pertaining to essential oil processing are still widely used in many parts of the world. Water distillation, water and steam distillation, steam distillation, cohobation, maceration and enfleurage are the most commonly used methods. When oil yield from distillation is poor, maceration may be a preferred method. Distillation methods are good for powdered almonds, rose petals and rose blossoms, whereas solvent extraction is suitable for expensive, delicate and thermally unstable materials such as jasmine, tuberose, and hyacinth. In general, water distillation is the most favored method of plant essential oil extraction.

Essential oils can be derived from one or more plant parts, for example, flowers, leaves, stems, bark, wood, roots, seeds, fruits, rhizomes, and gums or oleoresin exudations. However, some plants such as those of *Cannabis* genus require additional treatments to improve the final yield and composition of the extraction. In addition, it is desirable to increase the yield of essential oils (and in particular, terpenes contained therein) and oleoresins (and in particular, resin alcohols, resin acids and resin phenolics contained therein).

SUMMARY OF THE INVENTION

In one aspect, this disclosure provides an apparatus (or system) for extracting essential oils and oleoresins from a plant material, comprising a circulation pump, a discharging pump, an extraction module, a reservoir, a first evaporator, and a first condenser. The discharge pump is fluidly connected to the circulation pump. The extraction module includes at least one extraction vessel for receiving the plant material. The at least one extraction vessel has a lower part fluidly connected to the discharge pump and an upper part fluidly connected to the circulation pump. The lower and upper parts are configured with a lower filter and an upper filter, respectively. The reservoir is fluidly connected to the discharge pump, and the reservoir is configured to store a solvent containing a C1 to C4 fluorinated hydrocarbon. The first evaporator is fluidly connected to the circulation pump. The first condenser is fluidly connected to the circulation pump, and to the reservoir. In a short loop circulation mode the discharge pump pumps a solution comprising the solvent and one or more active components of the plant material dissolved therein from the bottom of the at least one extraction vessel, passing through the circulation pump and then back to the top of the at least one extraction vessel.

According to certain embodiments of this disclosure, in a long loop circulation mode the discharge pump pumps the solution comprising the solvent and one or more active components of the plant material dissolved therein from the bottom of the at least one extraction vessel, passing through the circulation pump, and then fed into the first evaporator where the solvent is gasified, and the circulation pump pumps the gasified solvent to the first condenser. In one embodiment, the apparatus (or system) further comprises a vapor pump for facilitating vaporization of the solvent. The vapor pump is fluidly connected to the top of the at least one extraction vessel, to the circulation pump, and to the first condenser.

According to certain embodiments of this disclosure, the first evaporator and the first condenser are fluidly connected via a heat pump.

An apparatus (or system) of this disclosure may further comprise a vapor pump for facilitating vaporization of the solvent. The vapor pump is fluidly connected to the top of the at least one extraction vessel, to the circulation pump, and to the first condenser.

According to certain embodiments of this disclosure, the apparatus (or system) further comprises a second condenser fluidly connected to the vapor pump and to the reservoir. In one embodiment of this disclosure, in a long loop circulation mode the vapor pump pumps a vapor of the solvent from the top of the at least one extraction vessel to the second condenser.

In some other embodiments, the apparatus (or system) further comprises a second evaporator fluidly connected to the first evaporator. According to one embodiment of this disclosure, the first evaporator is configured to work at a temperature lower than that of the second evaporator, and the first evaporator is configured to work at a pressure lower than that of the second evaporator. In addition, the second evaporator may be fluidly connected to the reservoir.

According to certain embodiments of this disclosure, the first evaporator and the first condenser are fluidly connected via a heat pump. In some other embodiments, the second evaporator and the first condenser are fluidly connected via the heat pump. According to one embodiment of this disclosure, in a long loop circulation mode the discharge pump pumps a solution comprising the solvent and one or more active components of the plant material dissolved therein from the bottom of the at least one extraction vessel, passing through the circulation pump, and then fed into the first and second evaporators where the solvent is gasified, and the heat pump liquefies the gasified solvent and send the liquefied solvent into the first condenser.

According to certain embodiments of this disclosure, the short loop circulation mode is performed at a flow rate of 4 to 6 L/min (in and out of the at least one extraction vessel). Further, the short loop circulation mode may be performed for about 20 minutes at about 35° C. or for about 45 minutes at about 55° C.

In another aspect, this disclosure provides an apparatus (or system) for extracting essential oils and oleoresins from a plant material, comprising a circulation pump, a discharging pump, an extraction pump, a reservoir, a first evaporator, a second evaporator, a first condenser, a second condenser, and a vapor pump. The discharge pump fluidly is connected to the circulation pump. The extraction module includes a first extraction vessel and a second extraction vessel, the first extraction vessel has a first lower part fluidly connected to the discharge pump and a first upper part fluidly connected to the circulation pump, and the second extraction vessel has a second lower part fluidly connected to the discharge pump and a second upper part fluidly connected to the circulation pump. The reservoir is fluidly connected to the discharge pump, and the reservoir is configured to store a solvent containing a C1 to C4 fluorinated hydrocarbon. The first evaporator is fluidly connected to the circulation pump. The second evaporator is fluidly connected to the first evaporator. The first condenser is fluidly connected to the circulation pump, and to the reservoir. The second condenser is fluidly connected to the reservoir. The vapor pump is configured for facilitating vaporization of the solvent, and the vapor pump is fluidly connected to the first upper part of the first extraction vessel, to the second upper part of the second extraction vessel, to the circulation pump, to the first condenser, and to the second condenser.

According to certain embodiments of this disclosure, the first lower part and first upper part are configured with a lower filter and an upper filter, respectively.

According to certain embodiments of this disclosure, the second lower part and second upper part are configured with a lower filter and an upper filter, respectively.

According to certain embodiments of this disclosure, the first evaporator is configured to work at a temperature lower than that of the second evaporator, and the first evaporator is configured to work at a pressure lower than that of the second evaporator.

According to certain embodiments of this disclosure, the first evaporator and the first condenser are fluidly connected via a heat pump. In some other embodiments, the second evaporator and the first condenser are fluidly connected via the heat pump. According to one embodiment of this disclosure, the vapor pump pumps a vapor of the solvent from the top of the first extraction vessel to the second condenser, and the discharge pump pumps a solution comprising the solvent and one or more active components of the plant material dissolved therein from the bottom of the second extraction vessel, passing through the circulation pump, and then fed into the first and second evaporators where the solvent is gasified, and the heat pump liquefied the gasified solvent and send the liquefied solvent into the first condenser.

In still another aspect, this disclosure features a method for extracting essential oils and oleoresins from a plant material using an apparatus (or system) of this disclosure.

Providing an apparatus comprising a circulation pump; a discharge pump fluidly connected to the circulation pump; an extraction module including at least one extraction vessel for receiving the plant material, the at least one extraction vessel having a lower part fluidly connected to the discharge pump and an upper part fluidly connected to the circulation pump, wherein the lower and upper parts are configured with a lower filter and an upper filter, respectively; a reservoir fluidly connected to the discharge pump, the reservoir being storing a solvent containing a C1 to C4 fluorinated hydrocarbon; a first evaporator fluidly connected to the circulation pump; and a first condenser fluidly connected to the circulation pump, and to the reservoir, the method comprises: extracting one or more active components from a plant material placed in the at least one extraction vessel through a short loop circulation, wherein in the short loop circulation the discharge pump pumps a solution comprising the solvent and one or more active components of the plant material dissolved therein from the bottom of the at least one extraction vessel, passing through the circulation pump, and then back to the top of the at least one extraction vessel; and extracting the plant material remained in the at least one extraction vessel through a long loop circulation, wherein in the long loop circulation the discharge pump pumps a solution comprising the solvent and one or more active components of the plant material dissolved therein from the bottom of the at least one extraction vessel, passing through the discharging pump and then through the circulation pump, and then fed into the first evaporator where the solvent is gasified, and the circulation pump pumps the gasified solvent to the first condenser.

According to certain embodiments of this disclosure, the short loop circulation mode is performed at a flow rate of 4 to 6 L/min (in and out of the at least one extraction vessel). Further, the short loop circulation mode may be performed for about 20 minutes at about 35° C. or for about 45 minutes at about 55° C.

These and other aspects will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The foregoing summary, as well as the following detailed description of the invention, will be better understood when read in conjunction with the appended drawing. In the drawings.

DESCRIPTION OF THE INVENTION

Unless defined otherwise, all technical and scientific terms used herein have the same meaning as commonly understood by a person skilled in the art to which this invention belongs.

As used herein, the singular forms "a", "an", and "the" include plural referents unless the context clearly dictates otherwise. Thus, for example, reference to "a sample" includes a plurality of such samples and equivalents thereof known to those skilled in the art.

The term "about" as used herein when referring to a measurable value such as a temperature, an amount, a temporal duration, and the like, is meant to encompass variations of and from the specified value, in particular variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

Figure 1A:
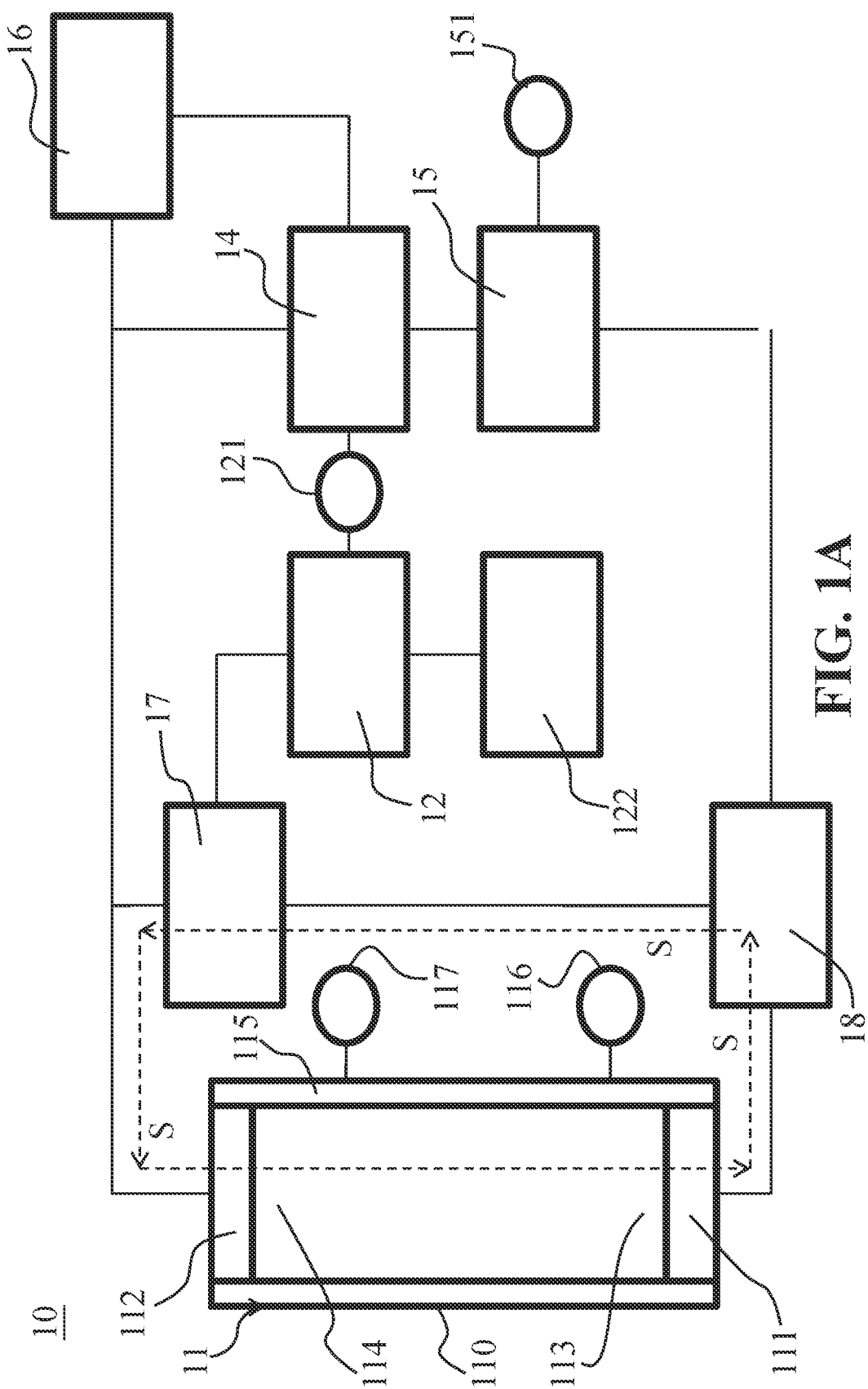
FIG. 1A is a schematic diagram of an apparatus for extracting essential oils and oleoresins from a plant material according to one embodiment of this disclosure.
Figure 1B:
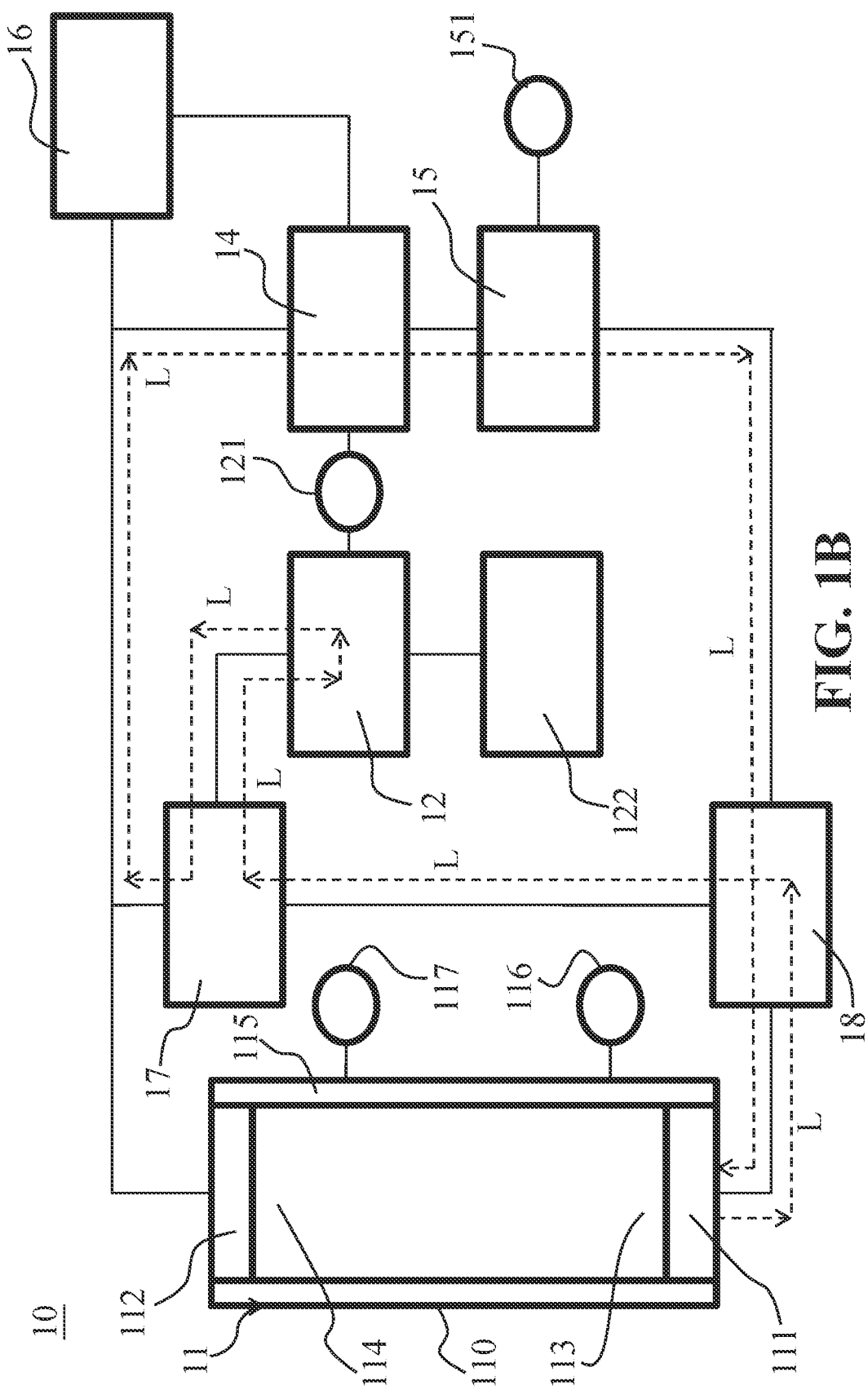
FIG. 1B is another schematic diagram of the apparatus for extracting essential oils and oleoresins from a plant material according to said embodiment of this disclosure.
Figure 1C:
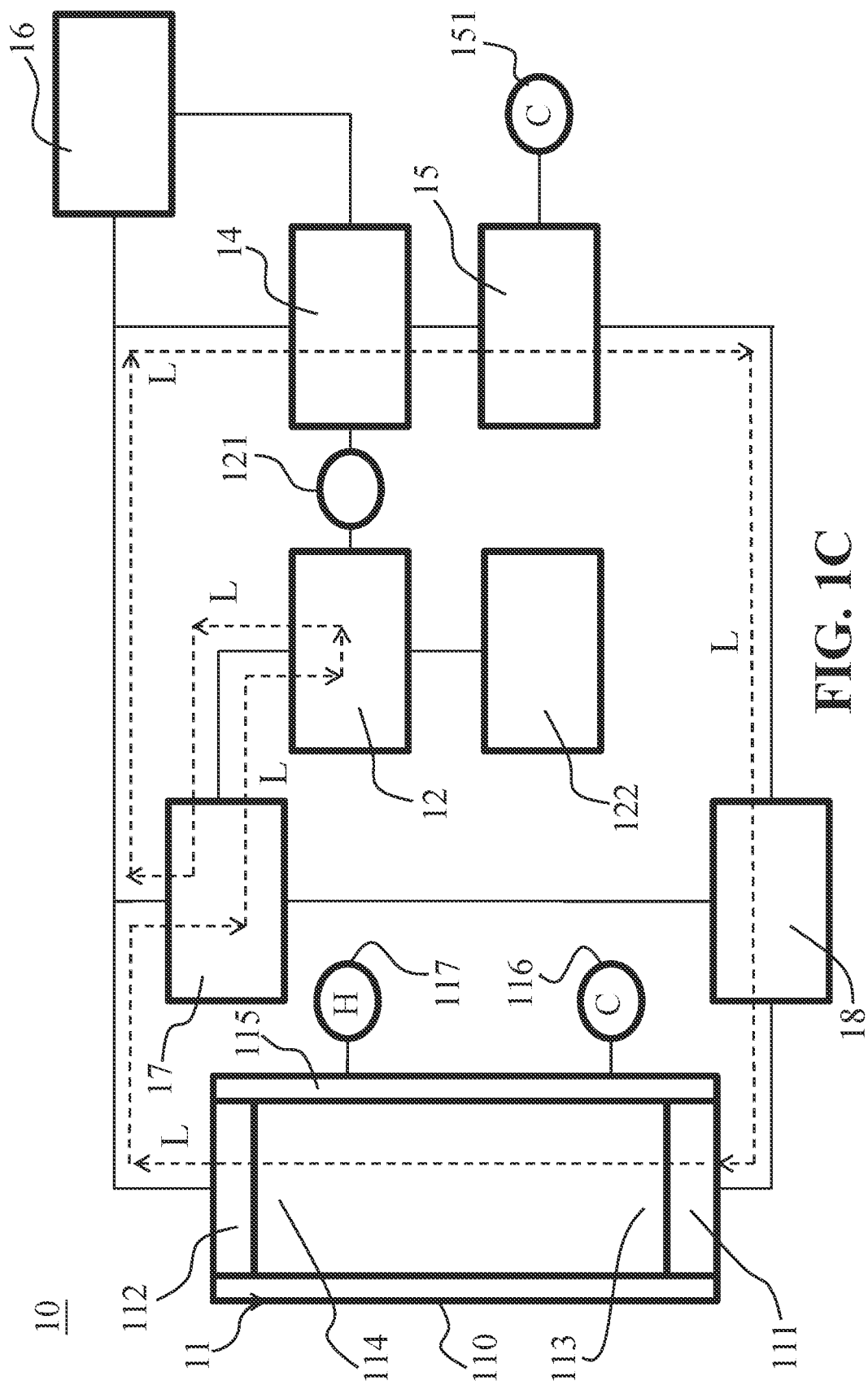
FIG. 1C is another schematic diagram of the apparatus for extracting essential oils and oleoresins from a plant material according to said embodiment of FIG. 2 is a schematic diagram of an apparatus for extracting essential oils and oleoresins from a plant material according to one embodiment of this disclosure.

Referring to FIG. 1A, FIG. 1B and FIG. 1C, there is shown an apparatus 10 for extracting essential oils and oleoresins from a plant material. The apparatus 10 comprises a circulation pump 17, a discharge pump 18, an extraction module 11, a reservoir 15, first evaporator 12, and a first condenser 14.

As shown in FIG. 1A, FIG. 1B and FIG. 1C, the discharge pump 18 is fluidly connected to the circulation pump 17. The extraction module 11 includes at least one extraction vessel 110 for receiving the plant material. The reservoir 15 is fluidly connected to the discharge pump 18. The first evaporator 12 is fluidly connected to the circulation pump 17. The first condenser 14 is fluidly connected to the circulation pump 17, and to the reservoir 15. The vapor pump 16 is provided for facilitating vaporization of solvent, and the vapor pump 16 is fluidly connected to the top of the at least one extraction vessel 110, to the circulation pump 17, and to the first condenser 14. The at least one extraction vessel 110 has a lower part 113 and an upper part 114. The lower part 113 is fluidly connected to the discharge pump 18, and the upper part 114 is fluidly connected to the circulation pump 17. The lower and upper parts 113, 114 are configured with a lower filter 111 and an upper filter 112, respectively. The reservoir 15 is configured to store a solvent containing one or more C1 to C4 fluorinated hydrocarbon. For example, the C1 to C4 fluorinated hydrocarbon can be, but not limited to 1,1,1,2-tetrafluoroethane.

As shown in FIG. 1A, in a short loop circulation S the discharge pump 18 pumps a solution comprising the solvent and one or more active components of the plant material dissolved therein from the bottom of the at least one extraction vessel 110, passing through the circulation pump 17, and then back to the top of the at least one extraction vessel 110.

As shown in FIG. 1B, in a long loop circulation L the discharge pump 18 pumps the solution comprising the solvent and one or more active components of the plant material dissolved therein from the bottom of the at least one extraction vessel 110, passing first through the discharge pump 18 and then through circulation pump 17, and then fed into the first evaporator 12 where the solvent is gasified, and the circulation pump 17 pumps the gasified solvent to the first condenser 14. This is called batch extraction loop.

As shown in FIG. 1C, in another long loop circulation L the discharge pump 18 pumps a solution comprising the solvent and one or more active components of the plant material dissolved therein from the top of the at least one extraction vessel 110, passing through the circulation pump 17, and then fed into the first evaporator 12 where the solvent is gasified, and the circulation pump 17 pumps the gasified solvent to the first condenser 14. This is called continues extraction loop.

The reservoir 15 is configured to store a liquid solvent and may be cooled externally via a cooler (or a cooling pipe) 151. The at least one extraction vessel 110 is wrapped in a jacket 115 which may be cooled by a cooler 116 and/or heated by a heater 117 externally.

The circulation pump 17 is a complex system of filers, pipes and valves allowing the solvent and miscella current to change and interconnect between the attached vessels. There is a gas and liquid piping distribution systems that are usually phase separated. A gas or a vapor pump 16 helps the gaseous phase to evacuate faster from the extraction module 11 and a liquid pump part of the circulation pump 17 assembly helps the liquid phase to recirculate in the extraction module 11 or feed to the filter or evaporation system. A filter is installed before the pump to filter particles and after the pump to filter particles in the miscella flow. In general, the circulation pump 17 comprises one or more pipes, one or more pumps and/or one or more valves connecting the first condenser 14, the first evaporator 12, the at least one extraction vessel 110, and the discharge pump 18.

The discharge pump 18 is a complex assembly of pipes, filters and pumps in order to provide the in and out flow of the liquid phase of solvent and miscella in the extraction module 11. The filter is placed before the pump in order to filter particles in the miscella flow. The discharge pump 18 comprises one or more pipes, one or more pumps and/or one or more valves connecting the reservoir 15, the at least one extraction vessel 110, and the circulation pump 17.

The vapor pump 16 is a complex system of filters, pipes and pumps that manages the vapor recovery process. The vapor pump 16 is connected to the vapor distribution system of the circulation pump 17 and produces the required pressure to increase the vapor condensation and liquefaction required for the vapors to condense in the condenser 14. The vapor pump 16 comprises one or more pipes, one or more pumps and/or one or more valves connecting the first condenser 14, the reservoir 15, the at least one extraction vessel 110, and the circulation pump 17. The first evaporator 12 and the first condenser 14 are connected via a heat pump 121. A collection vessel 122 is connected to the first evaporator 12.

The plant material is loaded into the at least one extraction vessel 110 and soaked in the (liquid) solvent containing one or more C1 to C4 fluorinated hydrocarbon fed from the reservoir 15 via the discharge pump 18 and forced into the plant material using a pump until the solvent reaches the top of the at least one extraction vessel 110 and all the gas phase has been evacuated. The jacket 115 may be externally or internally heated or chilled to the point for achieving an appropriate pressure in the at least one extraction vessel 110 under a pre-determined temperature to extract desired active ingredients from the plant material.

The apparatus 10 may operate under at least three 3 modes: a soaking mode, a short loop circulation mode, and a long loop circulation mode.

In soaking mode, the at least one extraction vessel 110 stays loaded with the solvent and the plant material soaked in the solvent for as long as the processing time under the processing pressure. After such time the solvent and the constituent mixture called miscella are sent to the first evaporator 12 via the discharge pump 18 connected to the circulation pump 17 (starting the long loop circulation mode).

In long loop circulation mode, the circulation pump 17 allows the overflow solvent to pass to the first evaporator 12 where excess vapors are passed from the first evaporator 12 to the first condenser 14 via the circulation pump 17. The vaporization may be additionally increased by the vapor pump 16. At the same time, a fresh solvent is fed to the at least one extraction vessel 110 via the discharge pump 18 which can be either gravity fed or induced by a liquid pump.

In short loop circulation mode, the circulation pump 17 and the discharge pump 18 are fluidly connected to ensure that there is a steady recirculation without the presence of a gas phase for a pre-determined period of time. When the time is up, the discharge pump 18 via the help of a pump and via the circulation pump 17 drains the solvent mixture into the first evaporator 12. At the same time, the first evaporator 12, having a temperature higher than that of the at least one extraction vessel 110, gasifies the solvent and sends the vapors via the circulation pump 17 to the first condenser 24 for liquefaction.

The short loop circulation mode is preferably performed at a flow rate of 4 to 6 L/min (in and out of the at least one extraction vessel 110). Further, the short loop circulation mode may be performed for about 20 minutes at about 35° C. or for about 45 minutes at about 55° C.

After all vapors from the first evaporator 12 liquefied in the first condenser 24 are fed to the reservoir 15 where they are kept liquid at a temperature lower than ambient temperature. After all solvent is vaporized from the extract and the extract is completely separated from solvent in the first evaporator 12, the extract is fed to the collection vessel 122. The process of gasification of the solvent in the first evaporator 12 requires heat and the process for liquefaction in the first condenser 14 requires coldness, which are provided by both ends of the heat pump 121, respectively.

After the liquid solvent is evacuated from the at least one extraction vessel 110, the at least one extraction vessel 110 is heated and the solvent residue is forced into fast evaporation. The vapors from the at least one extraction vessel 110 are fed to the first condenser 14 via the vapor pump 16. The vapor pump 16 comprises a set of gas pumps which speed up the process of evaporation by maintaining a low pressure in the at least one extraction vessel 110. The vapors from the at least one extraction vessel 110 liquefied in the first condenser 14 are fed to the reservoir 15 where they are kept liquid at a temperature lower than ambient temperature. The reservoir 15 is externally cooled to maintain the solvent in liquid phase.

Figure 2:
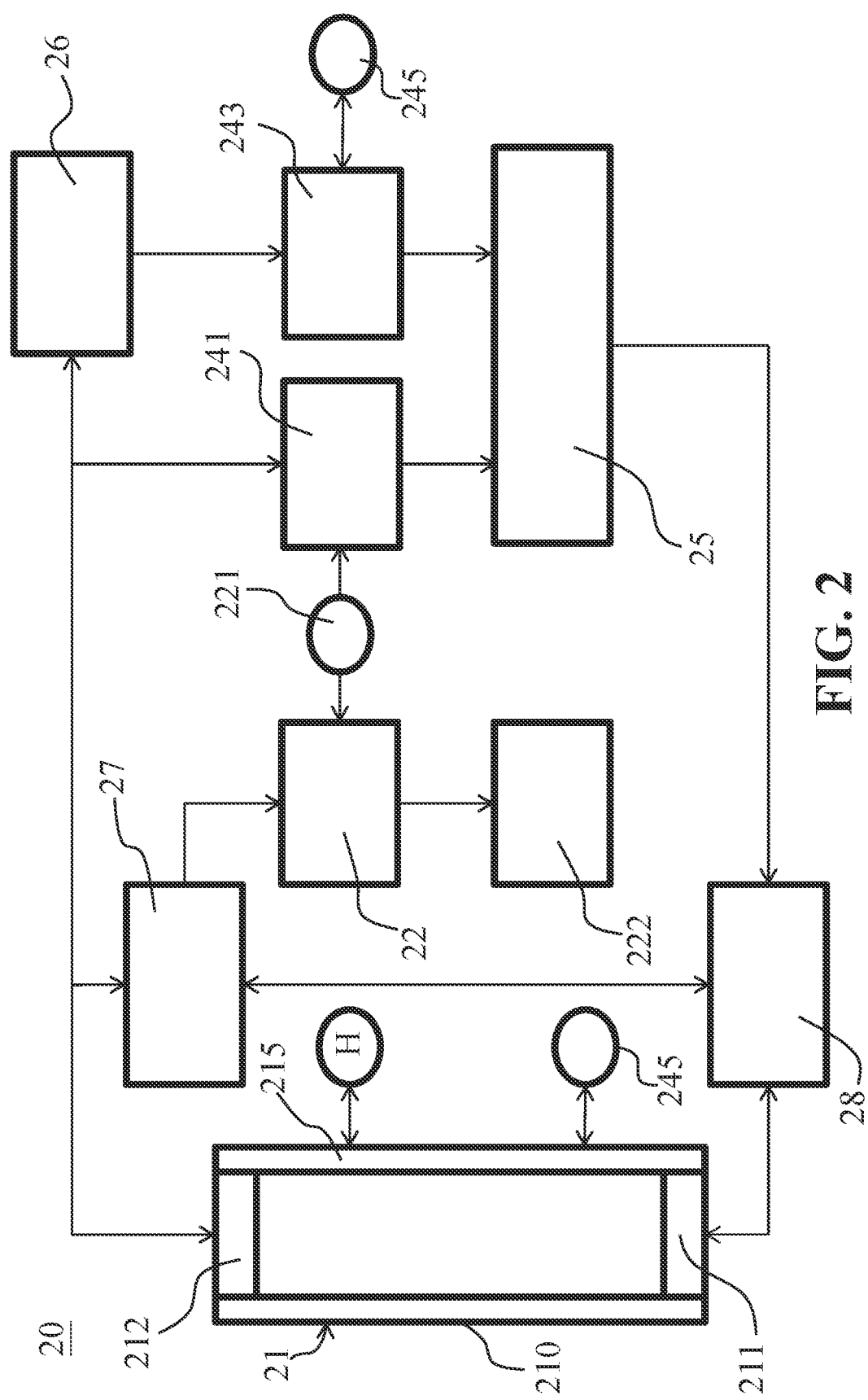

Referring to FIG. 2, there is shown an apparatus 20 for extracting essential oils and oleoresins from a plant material. The apparatus 20 comprises a circulation pump 27, a discharge pump 28, an extraction module 21, a reservoir 25, a first evaporator 22, first condenser 241, vapor pump 26, and a second condenser 243.

The is discharge pump 28 fluidly connected to the circulation pump 27. The extraction module 21 includes at least one extraction vessel 210 for receiving the plant material. The reservoir 25 is fluidly connected to the discharge pump 28. The first evaporator 22 is fluidly connected to the circulation pump 27. The first condenser 241 is fluidly connected to the circulation pump 27, and to the reservoir 25. The a vapor pump 26 is provided for facilitating vaporization of solvent, and the vapor pump 16 is fluidly connected to the top of the at least one extraction vessel 210, to the circulation pump 27, and to the first condenser 241. The second condenser 243 is disposed between and fluidly connected to the vapor pump 26 and the reservoir 25. The at least one extraction vessel 210 has a lower part and an upper part. The lower part is fluidly connected to the discharge pump 28, and the upper part is fluidly connected to the circulation pump 27. The lower and upper parts are configured with a lower filter 211 and an upper filter 212, respectively. The reservoir 25 is configured to store a solvent containing one or more C1 to C4 fluorinated hydrocarbon. The first evaporator 22 and the first condenser 241 are connected via a heat pump 221. Another heat pump 245 may be connected to the second condenser 243. A collection vessel 222 is connected to the first evaporator 22.

In this embodiment, the energy utilization may be further improved by connecting the heat pumps 221 and 245 which are mutually inverted by temperature in the current process. For example, the heat pump 221 is connected between the first evaporator 22 and the first condenser 241. Alternatively, the heat pump 245 may be on one side connected to a jacket 215 and the other to the second condenser 243. In this disclosure, heat pumps can be thermodynamic, or refrigeration coupled.

Figure 3:
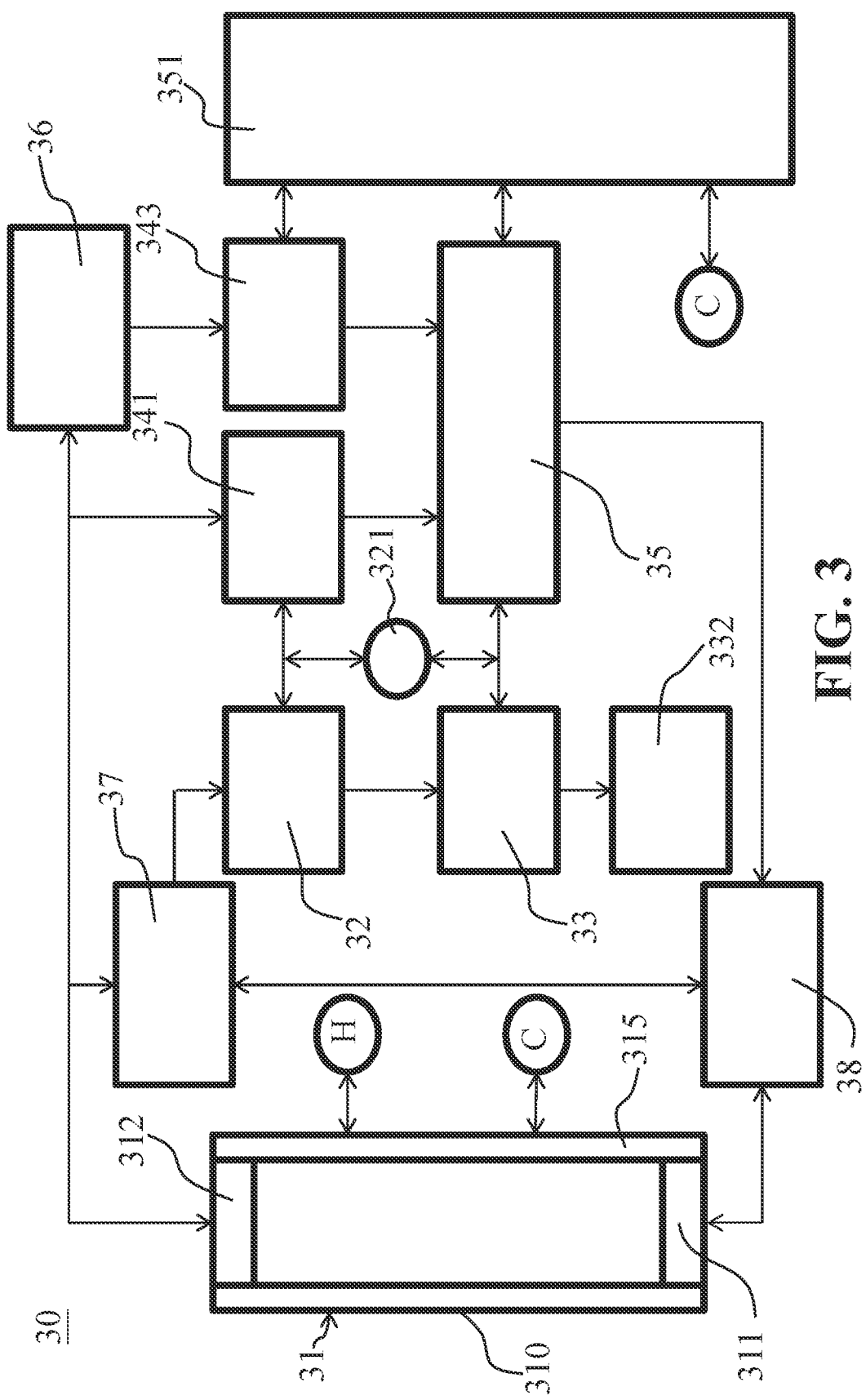
FIG. 3 is a schematic diagram of an apparatus for extracting essential oils and oleoresins from a plant material according to one embodiment of this disclosure.

Referring to FIG. 3, there is shown an apparatus 30 for extracting essential oils and oleoresins from a plant material. The apparatus 30 comprises a circulation pump 37, a discharge pump 38, an extraction module 31, a reservoir 35, a first evaporator 32, a second evaporator 33, a first condenser 341, and a second condenser 343. The discharge pump 38 is fluidly connected to the circulation pump 37. The extraction module 31 includes at least one extraction vessel 310 for receiving the plant material. The reservoir 35 is fluidly connected to the discharge pump 38. The first evaporator 32 is fluidly connected to the circulation pump 37. The second evaporator 33 is fluidly connected to the first evaporator 32. The first condenser 341 is fluidly connected to the circulation pump 37, and to the reservoir 35, a vapor pump 36 for facilitating vaporization of solvent, and the vapor pump 36 is fluidly connected to the top of the at least one extraction vessel 310, to the circulation pump 37, and to the first condenser 341. The second condenser 343 is disposed between and fluidly connected to the vapor pump 36 and the reservoir 35. The at least one extraction vessel 310 has a lower part and an upper part. The lower part is fluidly connected to the discharge pump 38, and the upper part is fluidly connected to the circulation pump 37. The lower and upper parts are configured with a lower filter 311 and an upper filter 312, respectively. The reservoir 35 is configured to store a solvent containing one or more C1 to C4 fluorinated hydrocarbon. The first evaporator 32 and the first condenser 341 are connected via a heat pump 321. A collection vessel 332 is connected to the second evaporator 33.

The process has similar flows as shown in FIG. 1A, FIG. 1B and FIG. 1C with the difference that the vapors from the first evaporator 32 are sent to the first condenser 341 and the vapors from the at least one extraction vessel 310 to the second condenser 343 via the vapor pump 36. There are also two evaporators where the first evaporator 32 is dropping the temperature and pressure of the solvent to speed up the separation in second evaporator 33.

The heat pump 321 is dual pump, either executed as 2 pumps located one located between first evaporator 32 and first condenser 341 and second between second evaporator 33 and reservoir 35 or as one pump with dual heat exchangers disposed between the first evaporator 32, the first condenser 341, the second evaporator (separator) 33 and the reservoir 35, to provide a fluid connection therebetween. External cooler 351 may be used to chill the second condenser 39, the reservoir 35 and the jacket 315 to speed up the process.

Figure 4:
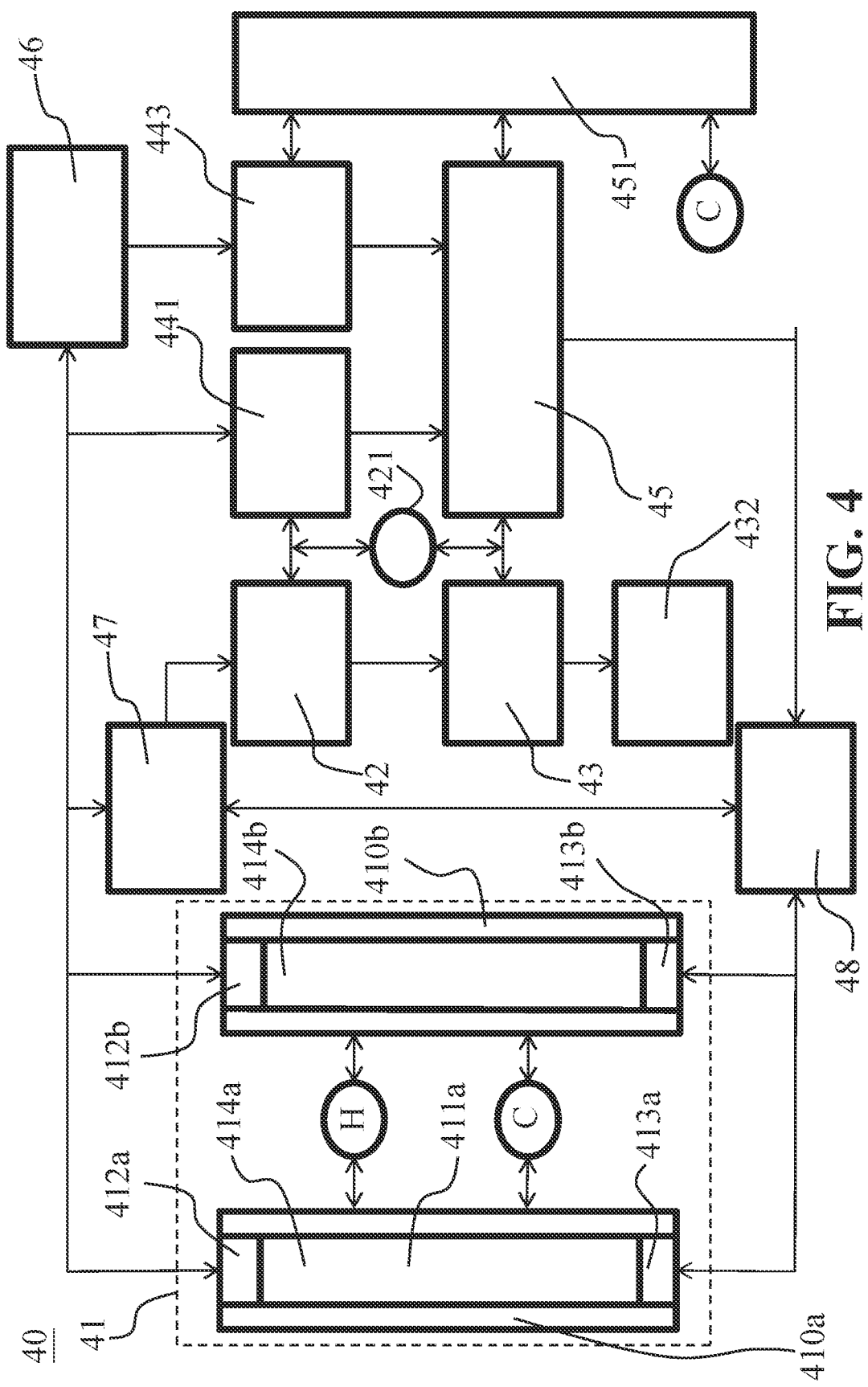
FIG. 4 is a schematic diagram of an apparatus for extracting essential oils and oleoresins from a plant material according to one embodiment of this disclosure.

Referring to FIG. 4, there is shown an apparatus 40 for extracting essential oils and oleoresins from a plant material. The apparatus 40 comprises a circulation pump 47, a discharge pump 48, an extraction module 41, a reservoir 45, a first evaporator 42, a second evaporator 43, a first condenser 441, vapor pump 46, and a second condenser 443. The discharge pump 48 is fluidly connected to the circulation pump 47. The extraction module 41 includes a first extraction vessel 410a and a second extraction vessel 410b. The reservoir 45 is fluidly connected to the discharge pump 48. The first evaporator 42 is fluidly connected to the circulation pump 47. The second evaporator 43 is fluidly connected to the first evaporator 42. The first condenser 441 is fluidly connected to the circulation pump 47, and to the reservoir 45. The vapor pump 46 is provided for facilitating vaporization of solvent. The second condenser 443 is disposed between and fluidly connected to the vapor pump 46 and the reservoir 45.

The first extraction vessel 410a has a first lower part 413a and a first upper part 414a. The first lower part 413a is fluidly connected to the discharge pump 48, and the first upper part 414a is fluidly connected to the circulation pump 47. The first lower and upper parts 413a, 414a are configured with a first lower filter 411a and a first upper filter 412a, respectively. Similarly, the second extraction vessel 410b has a second lower part 413b and a second upper part 414b. The second lower part 413b is fluidly connected to the discharge pump 48, and the second upper part 414b is fluidly connected to the circulation pump 47. The second lower and upper parts 413b, 414b are configured with a second lower filter 411b and a second upper filter 412b, respectively.

The vapor pump 46 is fluidly connected to the first upper part 414a of the first extraction vessel 410a, to the second upper part 414b of the second extraction vessel 410b, to the circulation pump 47, to the first condenser 441, and to the second condenser 443. The reservoir 45 is configured to store a solvent containing one or more C1 to C4 fluorinated hydrocarbon. A non-limiting example of the C1 to C4 fluorinated hydrocarbon is 1,1,1,2-tetrafluoroethane. A collection vessel 432 is connected to the second evaporator 43.

A heat pump 421 is disposed between the first evaporator 42, the first condenser 441, the second evaporator 43 and the reservoir 45, to provide a fluid connection therebetween.

The process has similar flow as the apparatus shown in FIG. 3 with the difference of an additional extraction vessel. In this embodiment the solvent miscella drained from the second extraction vessel 410b via the discharge pump 48 is evaporated first in the first evaporator 42 and then separated in the second evaporator 43 while the vapors from the second evaporator 43 are condensed via the first condenser 441 and liquefied in the reservoir 45 while the vapors from the plant material drying in the first extraction vessel 410a are sent to the second condenser 443 via the vapor pump 46.

Figure 5:
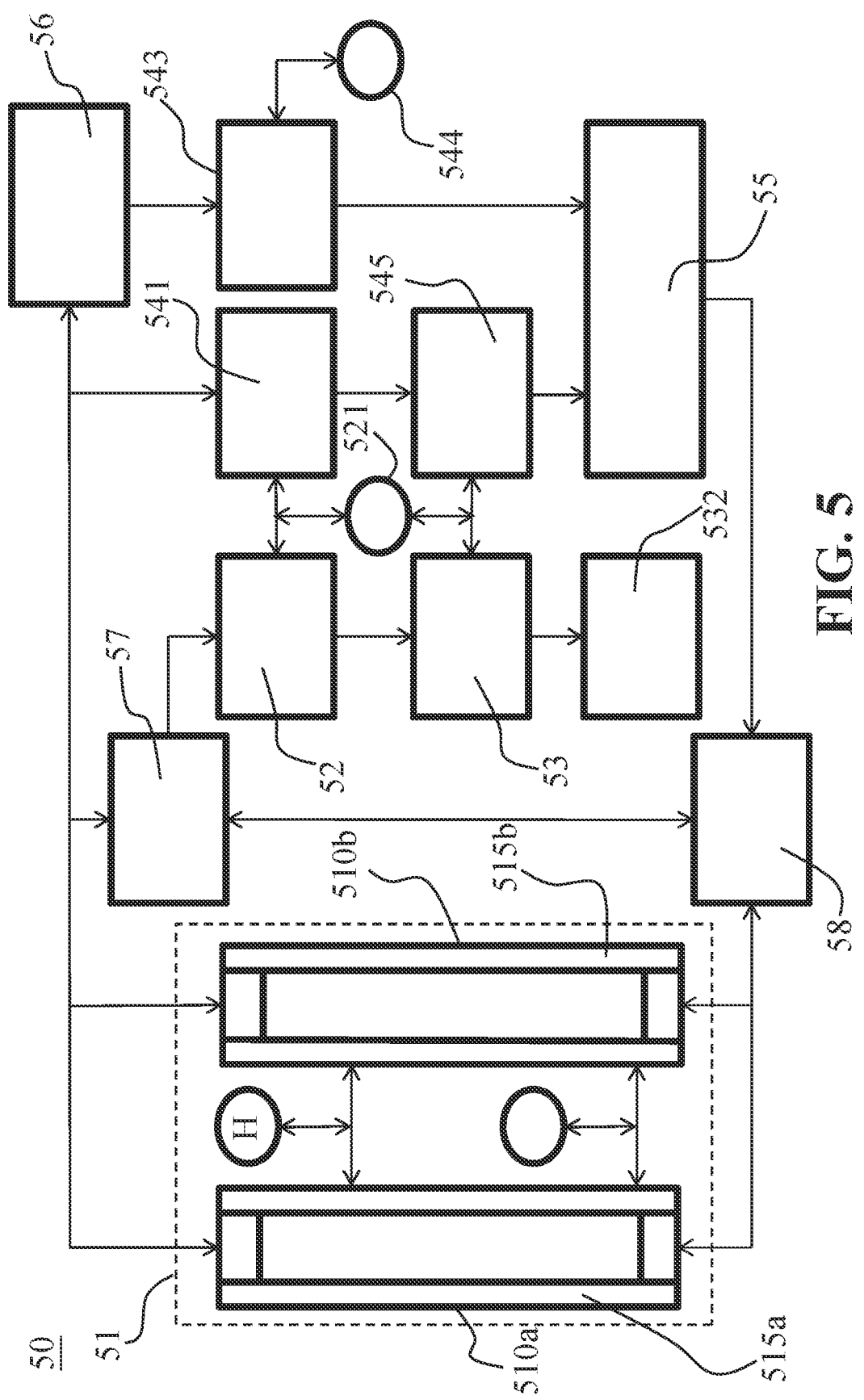
FIG. 5 is a schematic diagram of an apparatus for extracting essential oils and oleoresins from a plant material according to one embodiment of this disclosure.

Referring to FIG. 5, there is shown an apparatus 50 for extracting essential oils and oleoresins from a plant material. The comprises a circulation pump 57, a discharge pump 58, an extraction module 51, a reservoir 55, a first evaporator 52, a second evaporator 53, a first condenser 541, a vapor pump 56, a second condenser 543, a third condenser 545. The discharge pump 58 is fluidly connected to the circulation pump 57. The extraction module 51 includes a first extraction vessel 510a and a second extraction vessel 510b. The reservoir 55 is fluidly connected to the discharge pump 58. The first evaporator 52 is fluidly connected to the circulation pump 57. The second evaporator 53 is fluidly connected to the first evaporator 52. The first condenser 541 is fluidly connected to the circulation pump 57. The vapor pump 56 is provided for facilitating vaporization of solvent. The second condenser 543 is disposed between and fluidly connected to the vapor pump 56 and the reservoir 55. The third condenser 545 is disposed between and fluidly connected to the first condenser 541 and the reservoir 55.

The first extraction vessel 510a has a first lower part and a first upper part. The first lower part is fluidly connected to the discharge pump 58, and the first upper part is fluidly connected to the circulation pump 57. Similarly, the second extraction vessel 510b has a second lower part and a second upper part. The second lower part is fluidly connected to the discharge pump 58, and the second upper part is fluidly connected to the circulation pump 57.

The vapor pump 56 is fluidly connected to the first upper part (at a top) of the first extraction vessel 510a, to the second upper part (at atop) of the second extraction vessel 510b, to the circulation pump 57, to the first condenser 541, and to the second condenser 543. The reservoir 55 is configured to store a solvent containing one or more C1 to C4 fluorinated hydrocarbon. A first collection vessel 522 is connected to the first evaporator 52, and first collection vessel 532 is connected to the second evaporator 53.

A heat pump 521 is disposed between the first evaporator 52, the first condenser 541, the second evaporator 53 and the third condenser 545, to provide a fluid connection therebetween. Another heat pump 544 is connected on one side to the second condenser 543, and to the jackets 515a, 515b on the other (during the solvent recovery process).

In this embodiment, multiple staged condensers with separate collection vessels are used. For example, the first evaporator 52 coupled with the first condenser 541 may remove/collect a fraction in the first collection vessel 522, and then the second evaporator 53 coupled with the third condenser 545 may remove/collect another fraction in the second collection vessel 532, and so on.

Further, as the time for extraction may be from 15 min to 1.5 hours and the time for evaporation is usually 1 hour to 1.5 hours using multiple extraction modules 51 can optimize the workflow. As an example, to offset the 1 hour time for evaporation (solvent recovery) on 15 min extraction 4 extraction modules 41 can be used. They will work on the revolver principal where every 15 min material will be loaded, and the solvent recovery will be performing while the extraction is performed from the $1^{st}$ to the $4^{th}$ extraction. In general, the extraction modules 41 are multiple in the time of extraction to evaporation ratio the evaporators are multiple on the fractions need to be collected separate by temperature where the temperature increases from the first to the last while in the coupled condensers the temperature decreases with the same ratio, therefore they cross connect together.

For example, the extraction is at 30° C., the first evaporator 52 operates at 40° C. and the second evaporator 53 operates at 50° C., while the first condenser 541 operates at 30° C. and third condenser 545 operates at 20° C., wherein the first evaporator 52 is fluidly connected via the heat pump 521 to the third condenser 545 and the second evaporator 53 is fluidly connected via the heat pump 521 to the first condenser 541.

The evaporators may also work in parallel coupled with the extraction vessels. For example, the extraction is performed under 30° C., while a first evaporator evaporates at 40° C. and a coupled condenser operates at 20° C.; and on the next cycle, the extraction is performed under 40° C., while a second evaporator evaporates at 50° C. and a coupled condenser operates at 30° C.

Figure 6:
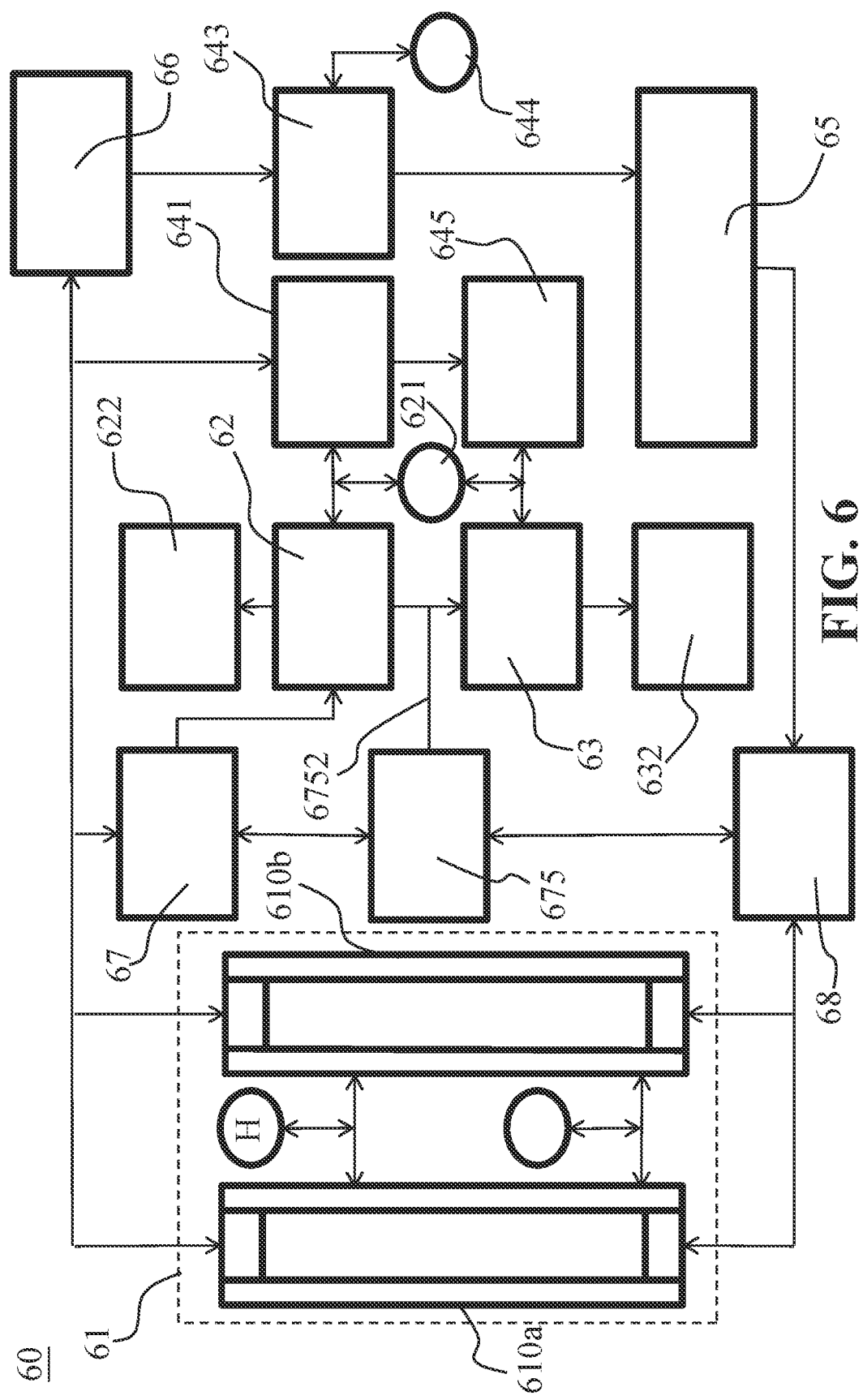
FIG. 6 is a schematic diagram of an apparatus for extracting essential oils and oleoresins from a plant material according to one embodiment of this disclosure.

Referring to FIG. 6, shown is an apparatus 60 for extracting essential oils and oleoresins from a plant material. The apparatus 60 comprises a circulation pump 67, a discharge pump 68, an extraction module 61, a reservoir 65, a first evaporator 62, a second evaporator 63, a first condenser 641, a vapor pump 66, a second condenser 643, and a third condenser 645. The discharge pump 68 is fluidly connected to the circulation pump 67. The extraction module 61 includes a first extraction vessel 610a and a second extraction vessel 610b. The reservoir 65 is fluidly connected to the discharge pump 68. The first evaporator 62 is fluidly connected to the circulation pump 67. The second evaporator 63 is fluidly connected to the first evaporator 62 The first condenser 641 is fluidly connected to the circulation pump 67. The vapor pump 66 is provided for facilitating vaporization of solvent. The second condenser 643 is disposed between and fluidly connected to the vapor pump 66 and the reservoir 65. The third condenser 645 is disposed between and fluidly connected to the first condenser 641 and the reservoir 65.

The first extraction vessel 610a has a first lower part and a first upper part. The first lower part is fluidly connected to the discharge pump 68, and the first upper part is fluidly connected to the circulation pump 67. Similarly, the second extraction vessel 610b has a second lower part and a second upper part. The second lower part is fluidly connected to the discharge pump 68, and the second upper part fluidly connected to the circulation pump 67.

The vapor pump 66 is fluidly connected to the first upper part (at a top) of the first extraction vessel 610a, to the second upper part (at a top) of the second extraction vessel 610b, to the circulation pump 67, to the first condenser 641, and to the second condenser 643. The reservoir 65 is configured to store a solvent containing one or more C1 to C4 fluorinated hydrocarbon. A collection vessel 632 is connected to the second evaporator 63.

A heat pump 621 is disposed between the first evaporator 62, the first condenser 641, the second evaporator 63 and the third condenser 645, to provide a fluid connection therebetween. Another heat pump 644 is connected on one side to the second condenser 643, and to the jackets of the first and second extraction vessels 610a, 610b on the other.

Further, a filter device 675 is disposed between and fluidly connected to the circulation pump 67 and the discharge pump 68.

In the present embodiment, a separation is performed by the filter device 675. Preferably, the filter device comprises a membrane filter to single out a desired constituent or fraction, for example, by its molecular weight. The filter device 675 may allow the main stream to go through into the first evaporator 62 for separation of one or more first ingredients, while single out a fraction with a larger molecular weight into the second evaporator 63 for separation of one or more second ingredients.

As an alternative, the filter device 675 may be an adsorbent filter. The adsorbent filter may be a cassette filled with specially selected media to absorb certain compounds. A non-limiting Example of adsorbent is earth compound mixed with silica and activated carbon in various proportions. The absorbed ingredient would stay with the adsorbent, and the adsorbent needs to be changed every time the plant material in the extraction vessel(s) is changed. This type of filter is also called a scrubbing filter.

In addition, the filter device 675 may be detachable and replaceable. Either a scrubbing or membrane filter can be chosen and installed, thereby configuring the roles of the first and second evaporators 62, 63 with a bypass pipe 6752 around the filter 675. The reason for disposing the bypass pipe 6752 is that in between the processes there is a pressure difference in the vessels anywhere between 1 to 12 bars and that pressure needs to be equalized between processes. The bypass pipe 6752 will be able to equalize the pressure between vessels first and then connect the filter in the loop to avoid taring and extreme pressure deviations when pressure is equalized in between vessels, in a pressurized system such as one of the apparatus 60.

A membrane filter requires one miscella (solvent and constituents) input and 2 outputs with different constituents where one is separating the lower and the second the higher molecule mass constituents. With that regards the 2 evaporators can be reconfigured instead in serial to a parallel architectural flow. For example, when a membrane filter is used, the first evaporator 62 may be used for the solvent with constituents and the second evaporator 63 may be used for higher molecule mass constituents usually dissolved in the main solvent or a co-solvent (e.g., acetone, ethanol, hexane etc.). The co-solvent may only be circulated in a secondary filter loop and not mixed with the main solvent loop 775, 723, 753 and 773 (FIG. 7).

Figure 7:
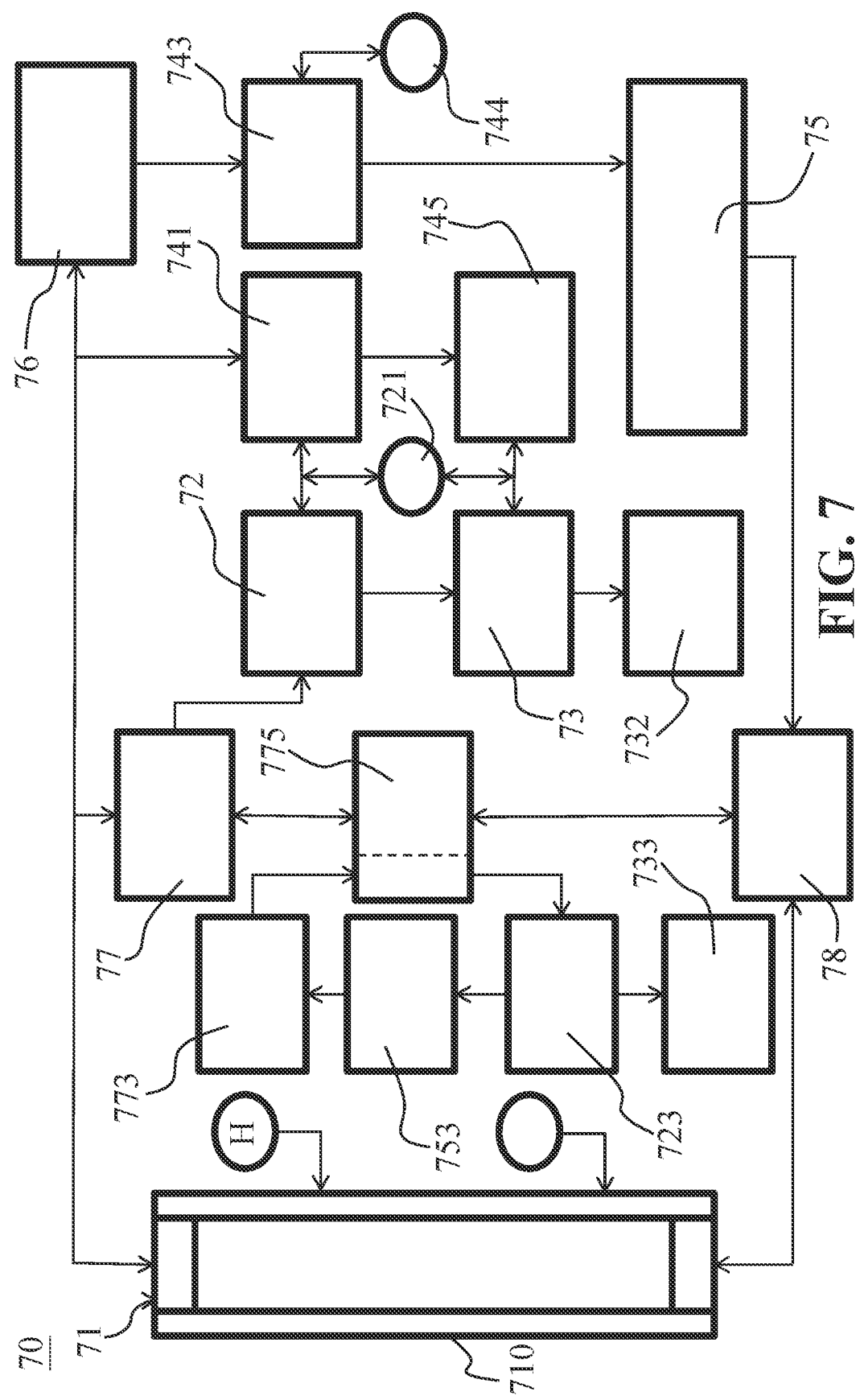
FIG. 7 is a schematic diagram of an apparatus for extracting essential oils and oleoresins from a plant material according to one embodiment of this disclosure.

Referring now to FIG. 7, shown is an apparatus 70 for extracting essential oils and oleoresins from a plant material. The apparatus 70 comprises a circulation pump 77, a discharge pump 78, an extraction module 71, a first evaporator 72, a first condenser 741, a vapor pump 76, a second condenser 743, and a third condenser 745. The discharge pump 78 is fluidly connected to the circulation pump 77. The extraction module 71 includes a extraction vessel 710. The reservoir 75 is fluidly connected to the discharge pump 78. The first evaporator 72 is fluidly connected to the circulation pump 77. The second evaporator 73 is fluidly connected to the first evaporator 72. The first condenser 741 is fluidly connected to the circulation pump 77. The vapor pump 76 is provided for facilitating vaporization of solvent. The second condenser 743 is disposed between and fluidly connected to the vapor pump 76 and the reservoir 75. The third condenser 745 is disposed between and fluidly connected to the first condenser 741 and the reservoir 75. A collection vessel 732 is connected to the second evaporator 73.

A heat pump 721 is disposed between the first evaporator 72, the first condenser 741, the second evaporator 73 and the third condenser 745, to provide a fluid connection therebetween. Another heat pump 744 is connected on one side to the second condenser 743, and to a jacket of the extraction vessel 710 on the other.

Further, a filter device 775 is disposed between and fluidly connected to the circulation pump 77 and the discharge pump 78. The filter device 775 preferably comprises a membrane filter.

In the present embodiment, the filter device is to be used with a co-solvent. Accordingly, an auxiliary loop is equipped to handle the co-solvent while a main loop still operates continuously during a short loop circulation as described above to isolate and collect constituents into the collection vessel 732 through the first evaporator 72 and the second evaporator (separator) 73. The auxiliary loop may comprise an auxiliary reservoir 753, an auxiliary circulation pump 773, an auxiliary collection vessel 733, an auxiliary evaporator 723; and an auxiliary collection vessel 733. The auxiliary circulation pump 773 includes, for example, one or more filters, one or more pumps, and one or more flowmeters (not shown). In this auxiliary loop, a solution comprising the co-solvent and one or more active components of the plant material dissolved therein co-solvent is circulated through the membrane filter of the filter device 775 and separated in the auxiliary evaporator 723. The separated active components are collected in the auxiliary collection vessel 733. Such filtration mode is also called self-cleaning filtering.

Referring to aforementioned drawings, this disclosure also provides a method for extracting essential oils and oleoresins from a plant material using an apparatus of this disclosure.

The method for extracting essential oils and oleoresins from a plant material according to this disclosure may comprise the steps of extraction and evaporation.

The step of extraction may be performed through a short loop circulation followed by a long loop circulation.

Take FIG. 1A, FIG. 1B and FIG. 1C as an illustration, providing an apparatus 10 comprising a circulation pump 17; a discharge pump 18 fluidly connected to the circulation pump 17; an extraction module 11 including at least one extraction vessel 110 for receiving the plant material, the at least one extraction vessel 110 having a lower part 113 fluidly connected to the discharge pump 18 and an upper part 114 fluidly connected to the circulation pump 17, wherein the lower and upper parts (114, 118) are configured with a lower filter 111 and an upper filter 112, respectively; a reservoir 15 fluidly connected to the discharge pump 18, the reservoir 15 being storing a solvent containing a C1 to C4 fluorinated hydrocarbon; a first evaporator 12 fluidly connected to the circulation pump 17; and a first condenser 14 fluidly connected to the circulation pump 17, and to the reservoir 15.

At first, the method is to extract one or more active components from a plant material placed in the at least one extraction vessel 110 through a short loop circulation. In the short loop circulation, the discharge pump 18 pumps a solution comprising the solvent and one or more active components of the plant material dissolved therein from the bottom of the at least one extraction vessel 110, passing through the circulation pump 17, and then back to the top of the at least one extraction vessel 110.

And then, the method is to extract the plant material remained in the at least one extraction vessel 110 through a long loop circulation. In the long loop circulation, the discharge pump 18 pumps a solution comprising the solvent and one or more active components of the plant material dissolved therein from the bottom of the at least one extraction vessel 110, passing first through the discharge pump 18 and then through the circulation pump 17, and the fed to the first evaporator 12 where the solvent is gasified, and the circulation pump 17 pumps the gasified solvent to the first condenser 14.

According to this disclosure, the short circulation loop will recirculate the solvent through the extraction module and will enrich the solvent every pass with constituents turning it into miscella stream. This process is also known as re-percolation. It is known state of art that solvent extracts constituents having similar dielectric constant. During the re-percolation the solvent will be changing its polarity and dielectric constant and will be widening the extraction selectivity while the miscella will be slowly changing its dielectric constant from as example 7 to around 15-25. This will widen the ability of the solvent to achieve additionally benefits in extraction of constituents outside of its original solubility limits.

In a short loop circulation as described above, a plant material is mixed with a solvent containing a C1 to C4 fluorinated hydrocarbon under predetermined pressure and temperature conditions in order to extract one or more target active components, wherein a solution comprising the solvent and one or more active components of the plant material dissolved therein is circulating through the extraction vessel(s) continuously for a predetermined time, so that the miscella is homogenized and the active components is dissolved homogeneously along the entire volume of the extraction vessel(s). This short loop circulation is also called reperculation.

The time, temperature and the process are carefully adjusted toward the extraction of target active components and the saturation of the components in the solution. The flow rate or the time of extraction is calculated based on the volume of the vessel and the extracted compounds. For example, a reperculation at a flow rate of 4 to 6 U/min for 20 minutes at 35° C. in 10 L vessel will turn the solvent 10 times, and every time the dielectric constant will increase with around 10% or with constant between 7 to 20, it would extract almost all flavonoid and acid components, while a re-percolation at a flow rate of 4 to 6 L/min for 45 minutes at 55° C. will change the dielectric constant from 10 to 32 and would extract almost all acid components (such as amino acids and organic acids).

The long loop circulation may work in 2 modes: draining (batch) (FIG. 1B) and washing (continues) (FIG. 1C). In the batch process, the solvent is introduced in the extraction module 11 from the reservoir 15 then drained and via the circulation pipes 18 and 17 fed to the evaporator 12 where extract separated in container 122 and solvent collected in the reservoir 15 through the second evaporator 14.

The continues washing is shown at FIG. 1C where the fresh solvent is constantly fed to the extraction module 11 from the reservoir 15 via the circulation pipe 18 then the extract is separated from the miscella in the separator 12 and the solvent vapors are further condensed in the reservoir 15 via the condenser 14. Additional re-percolation can be applied according FIG. 1A to the continued and batch extraction and this may be repeated until the plant material is fully depleted.

The step of evaporation is to separate the active components from the material or solution by vaporizing the solvent to its gaseous phase. There are 2 types of evaporation: drying and recovery. During drying the solvent is evaporated from the material located in the extraction module 11 and liquefied in the reservoir via the first and second condenser with the help of the circulation pipe 17 and recovery pump 16. And the recovery is a recovery of the solvent from the oil that happens in the first evaporator 12 where the recovered solvent is liquefied in the reservoir 15 via the condenser 14 and the extract collected in the collection vessel 122.

According to this disclosure, the method may further comprise the steps of drying and recovery. In the step of drying, the solvent is separated from the plant material by vaporizing the solvent to its gaseous phase, and in the step of recovery, the solvent in its gaseous phase is liquefied to its liquid phase for recycling.

It is believed that a person of ordinary knowledge in the art where this disclosure belongs can utilize this disclosure to its broadest scope based on the descriptions herein with no need of further illustration. Therefore, the descriptions and claims as provided should be understood as of demonstrative purpose instead of limitative in any way to the scope of this disclosure.

What is claimed is:

1. An apparatus for extracting essential oils and oleoresins from a plant material, comprising:
   a circulation pump;
   a discharge pump fluidly connected to the circulation pump;

an extraction module including at least one extraction vessel for receiving the plant material, the at least one extraction vessel having a lower part fluidly connected to the discharge pump and an upper part fluidly connected to the circulation pump, wherein the lower and upper parts are configured with a lower filter and an upper filter, respectively;

a reservoir fluidly connected to the discharge pump, wherein the reservoir is configured to store a solvent containing a C1 to C4 fluorinated hydrocarbon;

a first evaporator fluidly connected to the circulation pump; and a first condenser fluidly connected to the circulation pump, and to the reservoir;

wherein the apparatus is configured to operate in a short loop circulation mode, and in the short loop circulation mode the discharge pump pumps a solution comprising the solvent and one or more active components of the plant material dissolved in the solution from the bottom of the at least one extraction vessel, passing through the circulation pump, and then back to the top of the at least one extraction vessel.

2. The apparatus according to claim 1, wherein the apparatus is configured to operate in a long loop circulation mode, and in the long loop circulation mode the discharge pump pumps a solution comprising the solvent and one or more active components of the plant material dissolved in the solution from the bottom of the at least one extraction vessel, passing through the discharging pump and then through the circulation pump, and then fed into the first evaporator where the solvent is gasified, and the circulation pump pumps the gasified solvent to the first condenser.

3. The apparatus according to claim 2, further comprising a vapor pump for facilitating vaporization of the solvent, wherein the vapor pump is fluidly connected to the top of the at least one extraction vessel, to the circulation pump, and to the first condenser.

4. The apparatus according to claim 1, wherein the first evaporator and the first condenser are fluidly connected via a heat pump.

5. The apparatus according to claim 1, further comprising a vapor pump for facilitating vaporization of the solvent, wherein the vapor pump is fluidly connected to the top of the extraction vessel, to the circulation pump, and to the first condenser.

6. The apparatus according to claim 5, further comprising a second condenser disposed between and fluidly connected to the vapor pump and the reservoir.

7. The apparatus according to claim 6, wherein the apparatus is configured to operate in a long loop circulation mode, and in the long loop circulation mode the vapor pump pumps a vapor of the solvent from the top of the at least one extraction vessel to the second condenser.

8. The apparatus according to claim 6, further comprising a second evaporator fluidly connected to the first evaporator.

9. The apparatus according to claim 8, wherein the first evaporator is configured to work at a temperature lower than that of the second evaporator, and the first evaporator is configured to work at a pressure lower than that of the second evaporator.

10. The apparatus according to claim 8, wherein the first evaporator and the first condenser are fluidly connected via a heat pump.

11. The apparatus according to claim 8, wherein the second evaporator is fluidly connected to the reservoir.

12. The apparatus according to claim 10, wherein the second evaporator and the first condenser are fluidly connected via the heat pump.

13. The apparatus according to claim 12, wherein the apparatus is configured to operate in a long loop circulation mode, and in the long loop circulation mode the discharge pump pumps a solution comprising the solvent and one or more active components of the plant material dissolved in the solution from the bottom of the at least one extraction vessel, first passing through the discharge pump and then through the circulation pump, to the first and second evaporators where the solvent is gasified, and the heat pump liquefies the gasified solvent and sends the liquefied solvent into the first condenser.

14. The apparatus according to claim 1, wherein the short loop circulation mode is performed at a flow rate of 4 to 6 L/min.

15. The apparatus according to claim 14, wherein the short loop circulation mode is performed for about 20 minutes at about 35° C. or for about 45 minutes at about 55° C.

16. An apparatus for extracting essential oils and oleoresins from a plant material, comprising:

a circulation pump;

a discharge pump fluidly connected to the circulation pump;

an extraction module including a first extraction vessel and a second extraction vessel, the first extraction vessel having a first lower part fluidly connected to the discharge pump and a first upper part fluidly connected to the circulation pump, and the second extraction vessel having a second lower part fluidly connected to the discharge pump and a second upper part fluidly connected to the circulation pump;

a reservoir fluidly connected to the discharge pump, wherein the reservoir is configured to store a solvent containing a C1 to C4 fluorinated hydrocarbon;

a first evaporator fluidly connected to the circulation pump;

a second evaporator fluidly connected to the first evaporator;

a first condenser fluidly connected to the circulation pump, and to the reservoir;

a second condenser fluidly connected to the reservoir; and a vapor pump for facilitating vaporization of the solvent, the vapor pump being fluidly connected to the first upper part of the first extraction vessel, to the second upper part of the second extraction vessel, to the circulation pump, to the first condenser, and to the second condenser.

17. The apparatus according to claim 16, wherein the first lower part and first upper part are configured with a lower filter and an upper filter, respectively.

18. The apparatus according to claim 16, wherein the second lower part and second upper part are configured with a lower filter and an upper filter, respectively.

19. The apparatus according to claim 16, wherein the first evaporator is configured to work at a temperature lower than that of the second evaporator, and the first evaporator is configured to work at a pressure lower than that of the second evaporator.

20. The apparatus according to claim 16, wherein the first evaporator and the first condenser are fluidly connected via a heat pump.

21. The apparatus according to claim 20, wherein the second evaporator and the first condenser are fluidly connected via the heat pump.

22. The apparatus according to claim 21, wherein the vapor pump pumps a vapor of the solvent from the top of the first extraction vessel to the second condenser; and wherein the discharge pump pumps a solution comprising the solvent and one or more active components of the plant material dissolved in the solution from the bottom of the second extraction vessel, passing through the circulation pump, to the first and second evaporators where the solvent is gasified, and the heat pump liquefies the gasified solvent and sends the liquefied solvent into the first condenser.

23. A method for extracting essential oils and oleoresins from a plant material using an apparatus according to claim 1, comprising:
  extracting one or more active components from a plant material placed in the at least one extraction vessel through the short loop circulation mode; and
  extracting the plant material remained in the at least one extraction vessel through a long loop circulation mode, wherein in the long loop circulation mode the discharge pump pumps a solution comprising the solvent and one or more active components of the plant material dissolved in the solution from the bottom of the at least one extraction vessel, passing through the circulation pump, to the first evaporator where the solvent is gasified, and the circulation pump pumps the gasified solvent to the first condenser.

24. The method according to claim 23, wherein the short loop circulation mode is performed at a flow rate of 4 to 6 L/min.

25. The method according to claim 24, wherein the short loop circulation mode is performed for about 20 minutes at about 35° C. or for about 45 minutes at about 55° C.

* * * * *